United States Patent [19]

Alon et al.

[11] Patent Number: 5,701,283
[45] Date of Patent: Dec. 23, 1997

[54] METHOD AND APPARATUS FOR HIGH SPEED OPTICAL STORAGE DEVICE

[75] Inventors: Amir Alon, Sunnyvale, Calif.; Arie Heiman, Raanana; Itzhak Katz, Petach-Tikva, both of Israel

[73] Assignee: Zen Research N.V., Curacao, Netherlands Antilles

[21] Appl. No.: 559,419

[22] Filed: Nov. 15, 1995

[51] Int. Cl.$^6$ .......................................... G11B 7/00
[52] U.S. Cl. .................... 369/44.41; 369/124; 369/120; 369/54; 250/208.3; 386/115
[58] Field of Search ........................... 369/107, 111, 369/44.37, 44.41, 124, 48, 49, 54, 120, 95, 32, 33; 360/47, 63, 22, 53, 77.02, 77.06; 358/328, 340, 342; 386/22, 115, 114, 126; 250/208.2, 208.3

[56] References Cited

U.S. PATENT DOCUMENTS

| | | | |
|---|---|---|---|
| 4,460,988 | 7/1984 | Gordon | 369/32 |
| 4,486,870 | 12/1984 | Pettigrew et al. | 369/32 |
| 4,536,866 | 8/1985 | Jerome et al. | 369/112 |
| 4,646,280 | 2/1987 | Toyosawa | 369/50 |
| 4,839,876 | 6/1989 | Fennema | 369/32 |
| 4,918,676 | 4/1990 | Miyasaka | 369/32 |
| 4,972,396 | 11/1990 | Rafner | 369/32 |
| 4,980,876 | 12/1990 | Abate et al. | 369/44.11 |
| 4,989,190 | 1/1991 | Kuroe et al. | 369/32 |
| 5,001,732 | 3/1991 | Nomura et al. | 377/3 |
| 5,057,945 | 10/1991 | Shimada | 360/63 X |
| 5,081,617 | 1/1992 | Gelbart | 369/112 |
| 5,111,445 | 5/1992 | Psaltis et al. | 369/103 |
| 5,128,919 | 7/1992 | Narahara et al. | 369/97 |
| 5,150,347 | 9/1992 | Yanagi | 369/44.37 |
| 5,153,872 | 10/1992 | Maeda | 369/124 |
| 5,199,017 | 3/1993 | Kagami et al. | 369/44.28 |
| 5,210,726 | 5/1993 | Jackson et al. | 369/32 |
| 5,233,583 | 8/1993 | Reno | 369/44.26 |
| 5,239,530 | 8/1993 | Seo et al. | 369/54 |
| 5,245,597 | 9/1993 | Lee et al. | 369/44.28 |
| 5,274,507 | 12/1993 | Lee | 360/39 |
| 5,295,125 | 3/1994 | Oonishi et al. | 369/44.29 |
| 5,301,174 | 4/1994 | Matoba et al. | 369/44.28 |
| 5,313,448 | 5/1994 | Sukeda et al. | 369/121 |
| 5,361,245 | 11/1994 | Yoshida et al. | 369/44.28 |
| 5,394,386 | 2/1995 | Park et al. | 369/44.28 |
| 5,426,623 | 6/1995 | Alon et al. | 369/32 |
| 5,459,619 | 10/1995 | Colineau | 360/47 |
| 5,483,515 | 1/1996 | Cheng | 369/124 |
| 5,493,553 | 2/1996 | Maurice | 369/109 |
| 5,566,159 | 10/1996 | Shapiro | 369/99 |

Primary Examiner—Aristotelis M. Psitos
Assistant Examiner—Alan Faber
Attorney, Agent, or Firm—Fish & Neave; Nicola A. Pisano; Michael J. DeHaemer

[57] ABSTRACT

Methods and apparatus are provided for simultaneously reading data from multiple tracks of an optical disk at a high rate. Circuitry is provided for use with a detector matrix to read and buffer data in parallel from the multiple adjacent tracks, while asynchronously providing processed data to a host processor. Circuitry is also provided for electronic tracking of tracks on the optical disk and for reducing cross-talk between adjacent tracks. Circuitry is further provided for correcting phase errors resulting from variations in the linear velocity of the tracks being read, depending upon the radial position of the tracks.

20 Claims, 11 Drawing Sheets

METHOD AND APPARATUS FOR HIGH SPEED OPTICAL STORAGE DEVICE

FIELD OF THE INVENTION

This invention relates to methods and apparatus for retrieving information from an optical disk at high data rates by simultaneously reading multiple adjacent tracks.

BACKGROUND OF THE INVENTION

Due to their high storage density, long data retention life, and relatively low cost, optical disks are becoming increasingly popular as a means to distribute information. Large format disks have been developed for storing full length motion pictures. The compact disk (CD), and more recent mini disk (MD) formats were developed and marketed for the distribution of musical recordings and have essentially replaced vinyl records. Recognizing the limitations of floppy disks for the distribution of large programs and data bases, the optical format was adapted for use as a high-capacity, read-only data storage medium (CD-ROM) in the personal computer field. Even more recent developments in the application of optical disk technology, such as the Multi-Media CD (MMCD) developed by Sony Corp., the Super Density (SD) system developed by Toshiba Corporation, and the new Digital Video Disk (DVD) standard provide ever increasing storage capacities.

An optical disk is made of a transparent disk or substrate in which data, in the form of a serial bit-stream, is encoded as a series of pits in a reflective surface within the disk. The pits are arranged along a spiral or circular track. Data is read from the optical disk by focusing a low power laser beam onto a track on the disk and detecting the light reflected from the surface of the disk. By rotating the optical disk, the light reflected from the surface of the disk is modulated by the pattern of the pits rotating into and out of the laser's field of illumination. Optical and imaging systems detect the modulated, reflected, laser light and produce an electrical signal which may be decoded to recover the digital data stored on the optical disk. The recovered digital data, which may include error correcting codes and additional subcoded information, is further processed to recover the stored data which may then be converted to audio signals, or used as executable programs and data depending on the type of optical disk being read.

To be able to retrieve data from anywhere on a optical disk, the optical and imaging systems include a pickup assembly which may be positioned to read data from any disk track. Servo mechanisms are provided for focusing the optical system and for keeping the pickup assembly positioned over the track, despite disk warpage or eccentricity.

Because the data is retrieved from the disk serially, i.e. one bit at a time, the maximum data transfer rate for an optical disk reader is determined by the rate at which the pits pass by the pickup assembly. The linear density of the bits and the track pitch, is fixed by the specification of the particular optical disk format. For example, CD disks employ a track pitch of 1.6 µm, while the proposed MMCD employs a track pitch only about one-half as wide.

Previously known methods of increasing the data transfer rate of optical disk readers have focused on increasing the rate at which the pits pass by the pickup assembly by increasing the rotational speed of the disk itself. Currently, drives with rotational speeds of 2×, 4×, and 6× normal speed are commercially available, and 8× designs are on the horizon. However higher disk rotational speeds place increasing demands on the optical and mechanical subsystems within the optical disk player making such players more difficult and expensive to design and manufacture.

Other previously known techniques for increasing average data transfer rates involve methods to intelligently anticipate future read requests by a host processor. It has been observed that data access by computers frequently exhibit "locality of reference," which means that a future data access will be local, in either space or time, to a previous data access. Thus a CD-ROM drive or controller can "read ahead" and buffer the data that the host processor is likely to request next. When the host processor next requests data from the optical disk drive, the drive first checks if the requested data has already been read and buffered. If the data has already been buffered, the drive simply sends the buffered data to the host, avoiding the delays associated with repositioning the pickup assembly and reading data from the optical disk itself. While such caching techniques may speed up average data transfer rates, the maximum data transfer rate is still limited by the rotational velocity of the optical disk within the optical disk reader.

It would therefore be desirable to provide an optical disk reading apparatus and methods that provide high speed retrieval of information from an optical disk while avoiding the limitations imposed on optical disk rotation speeds encountered by previously known devices.

It would also be desirable to provide an optical disk reading apparatus and methods that provide high speed retrieval of information from an optical disk that permits accurate tracking of the data contained on the optical disk.

SUMMARY OF THE INVENTION

In view of the foregoing, it is an object of the present invention to provide an optical disk reading apparatus and methods that provide high speed retrieval of information from an optical disk while avoiding the limitations imposed on optical disk rotation speeds encountered by previously known devices.

It is a further object of this invention to provide an optical disk reading apparatus and methods that provide high speed retrieval of information from an optical disk that permits accurate tracking of the data contained on the optical disk.

These and other objectives of the invention are accomplished by providing methods and apparatus for processing, tracking, and reading data from multiple adjacent tracks simultaneously. In particular, apparatus constructed in accordance with the present invention employs a charge-coupled-device detector matrix simultaneously to generate electrical data signals representative of the information-bearing pits on multiple adjacent data tracks on an optical disk. Methods and apparatus are provided for synchronizing the readout of the data from the multiple adjacent tracks to account for radial variations in linear velocity.

Methods and apparatus are also provided for analyzing these electrical signals to derive a tracking signal, which is then employed to select certain of the electrical data signals for further processing, and for reducing cross-talk in the signals obtained from multiple adjacent tracks. Electrical data signals selected based on the tracking signals are then processed in accordance with previously known demodulation, decoding and error correction schemes and the resulting bit stream is buffered. The buffered data is subsequently asynchronously read out of the buffer for further processing per se known in the fields of digital audio, video, and computer processing.

Further features of the invention, its nature and various advantages will be more apparent from the accompanying drawings and the following detailed description of the preferred embodiments.

DETAILED DESCRIPTION OF THE INVENTION

Figure 1:
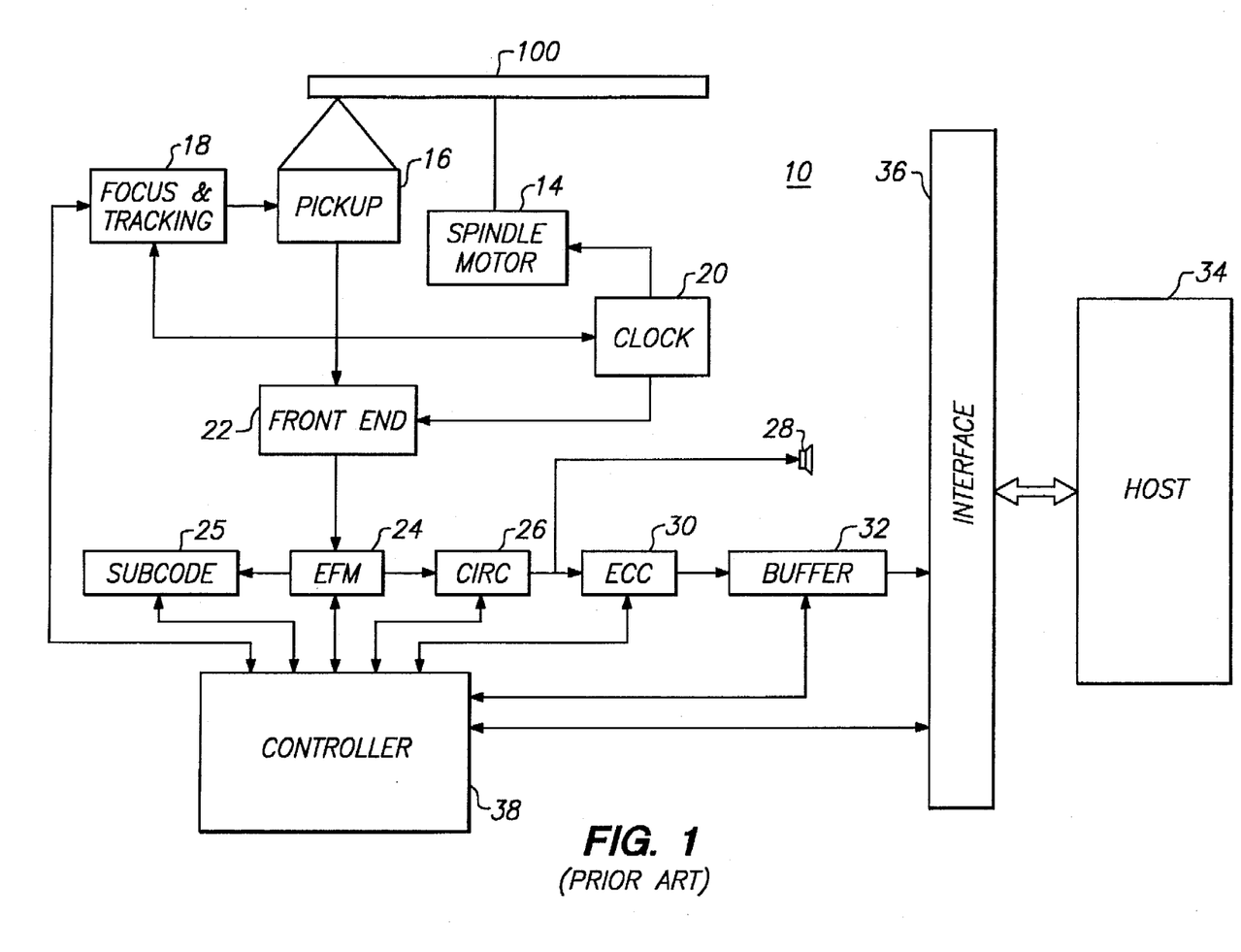
FIG. 1 is an illustrative block diagram of a previously known optical disk reader.

By way of overview, a brief description of the components and operation of a previously known optical disk reader 10 is described with respect to FIG. 1. The detailed description of the design and operation of such previously known optical disk readers may be found, for example, in *Compact Disk Technology*, H. Nakajima and H. Ogawa, published by Ohmsha, Ltd., Japan (1992), translated by Aschmann, C., IOS Press, Inc., Burke, Va., and *The Compact Disk Handbook*, Ken C. Pohlmann (2nd Ed. 1992), A-R Editions, Inc., Madison, Wis., both of which are incorporated herein in their entirety by this reference. The present invention is then described where it differs in major respects from the previously known system of FIG. 1.

It will of course be understood that the prior art system of FIG. 1 is merely illustrative of the various types of optical disk apparatus in which the methods and apparatus of the present invention may be employed. Thus, for example, applicants expect that the invention described herein may be advantageously employed in any of the MMCD, SD, or DVD systems currently under development. Moreover, it is to be understood that various features of the present invention may be fully and independently integrated into any of the optical disk systems previously known or now under development. To facilitate this understanding, the following description is provided with subheadings that refer to particular features that may be used individually or in combination.

Overview of Optical Disk System

Illustrative previously known optical disk reader 10 comprises a spindle motor 14 that rotates optical disk 100 at high speed and a pickup including an illumination source and a photodetector for generating electrical signals representative of information-bearing pits formed a reflective surface within optical disk 100. The electrical signals from the photodetector of pickup 100 are then passed to front end 22 and fourteen-to-eight demodulation circuitry 24, and under the control of controller 38, to Cross Interleaved Reed-Solomon Code circuitry 26, error correction code circuitry 30, subcode circuitry 25 and buffer 32. Controller 38 controls focus and tracking circuitry 18 and interface 36. For a digital audio system, the electrical signals may be processed into suitable analog signals (using circuitry not shown) connected to audio means 28, while for computer applications, the electrical signals are typically transferred from buffer 32 to host processor 34 via interface 36.

Spindle motor 14 spins optical disk 100 at speed that depends upon the radial location of pickup head 16 (for example, for a 1× CD-ROM spindle speed, approximately 200–500 RPM), to maintain a constant linear velocity of an optical disk track relative to pickup head 16. For a CD-ROM format, this linear velocity is generally 1.4 m/s, while for the proposed MMCD format it approaches 4 m/s. Pickup assembly 16 typically includes a laser diode that illuminates only a single data track on optical disk 100 and an optical sensor onto which an image reflected from the optical disk is projected. The intensity, or other property, of the light beam reflected from the surface of optical disk 100 is modulated by inhomogeneities in the reflective surface of the optical disk (i.e., bumps or pits, referred to hereinafter as "data spots") arranged in spiral or circular tracks on optical disk 100.

Pickup assembly 16 includes circuitry to generate an electronic signal representative of the modulation in the illumination impinging upon its optical sensor due to the present of the data spots. To ensure that the laser illumination remains focussed on the reflective surface of optical disk 100, pickup assembly 16 also provides signals to focus and tracking subsystem 18.

The data spots are recorded on optical disk 100 using a modulation code that permits a data clock to be recovered from as the data is read off of the optical disk. Phase-locked-loop (PLL) circuitry 20 recovers the data clock from, and maintains the data clock in synchrony with, the modulated electronic signal from pickup assembly 16. In addition to being used for extracting the data from the modulated signal, the data clock is representative of the linear velocity of the data track relative to pickup assembly 16 and may be used as a feedback signal to control the speed of spindle motor 14 to maintain a constant linear velocity.

Front end circuitry 22 uses the data clock from PLL 20 to recover a serial stream of bits from the electronic signal. Front end circuitry 22 contains additional circuitry to identify synchronization codes in the bit stream so that the serial bit stream may be correctly assembled into multi-bit data words which are transferred to demodulation circuitry 24. Demodulation circuitry 24 may be programmed for fourteen-to-eight demodulation (EFM), eight-to-fifteen demodulation (as in the SD systems), eight-to sixteen demodulation (EFM Plus), or use another suitable demodulation scheme. The demodulated data words, or symbols, are then assembled into blocks and decoded CIRC decoder 26 using a form of Cross Interleaved Read-Solomon code, for example, CIRC for CD-formats and CIRC Plus for DVD. Demodulated data words are also provided to subcode processor 25 which extracts data, such as block numbers, or song titles, which are recorded in subcode channels embedded in each block of data words.

For video and audio optical disk players, the data from CIRC decoder 26 represents, in digital form, the video or audio signal that was originally recorded and stored on the disk. These signals may then be converted to analog signals and the original recorded signal reproduced using conventional audio or video devices 28. Errors in the recovered audio or video signals are handled by interpolation and filtering circuitry (not shown) to calculate a value to use in place of the erroneous data. Because of the interpolation process, isolated errors in an audio or video signal are unlikely to be noticed when listening to the audio or viewing the video signals.

However, since a single bit error in data representing a computer program may render the program inoperable or the data unusable optical disks used for the storage and distribution of data and programs must have very low data error rates. To reduce the data error rates to acceptably low levels, error correction codes (ECC) are added to the data when it is recorded to the disk. ECC circuitry 30 uses to error correcting codes to detect and possibly correct errors in the data. Finally, the data is buffered in memory buffer 32 for transfer to host processor 34 via interface circuitry 36. Controller 38 is provided to orchestrate the operation of each of the optical disk reader subsystems and to control the operation of the optical disk reader as a whole.

In the previously known optical disk reader of FIG. 1, the rate of data transfer between the optical disk itself and the host processor is limited by the rate at which the data can be processed by the circuitries shown in FIG. 1. For example, for a 1× CD-ROM reader, the data rate of the signal being read from the optical disk is about 4.32 MHz, well within the processing capabilities of the electronic circuits involved. Even in optical disk readers having a spindle speed 6× the standard speed, the data transfer rate is limited by the speed at which the data can be read off the disk.

Overview of the Present Invention

Figure 2:
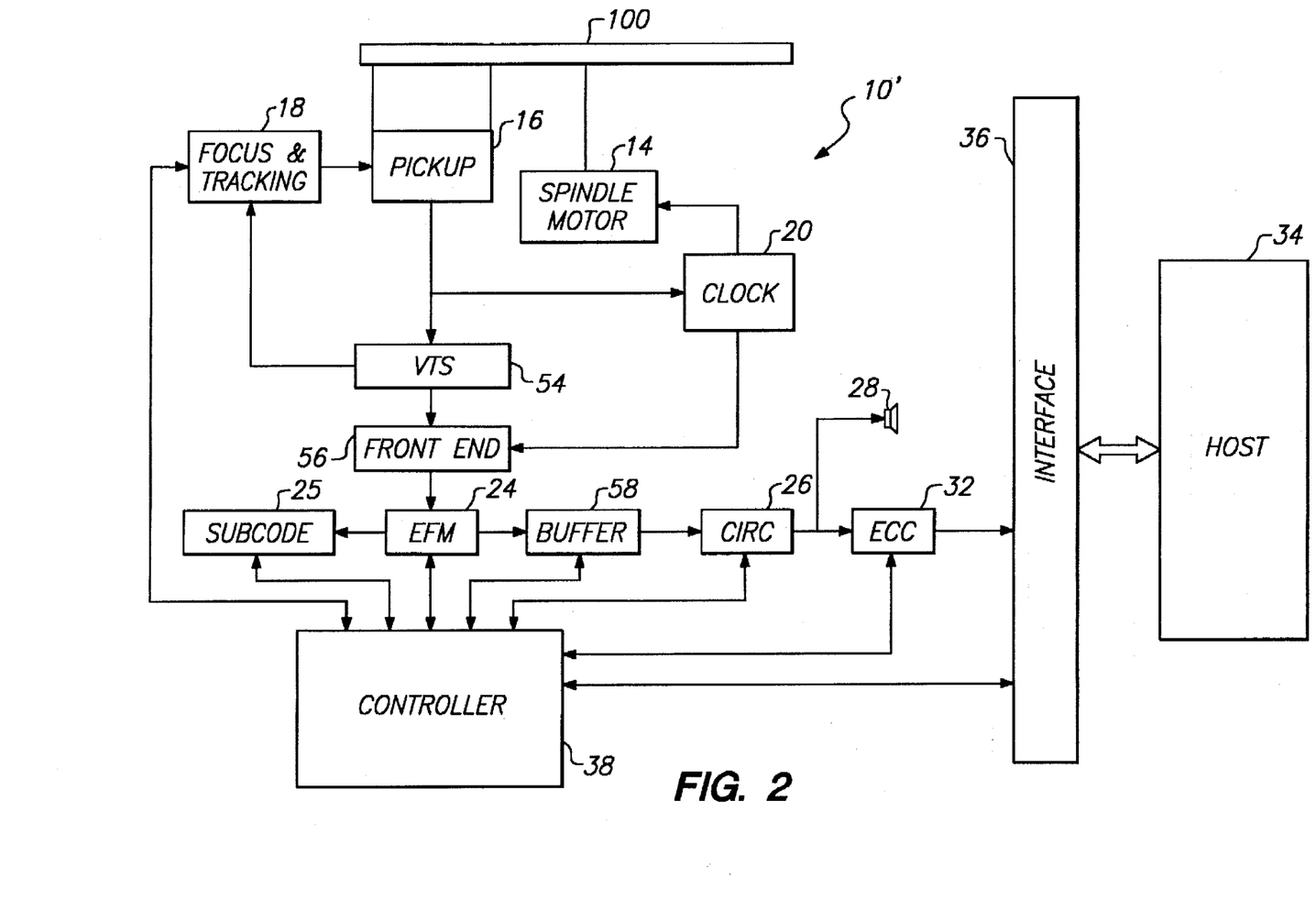
FIG. 2 is an illustrative block diagram of an optical disk reader constructed in accordance with the principles of the present invention.

Referring now to FIG. 2, an optical disk reader is described that provides a high data transfer rate, in accordance with the principles of the present invention, by reading multiple tracks of data from an optical disk simultaneously. Much of the circuitry of FIG. 2 may be common to or readily adapted from the circuitry of the system of FIG. 1. Accordingly, the following description describes in detail the differences between a previously known optical disk reader and apparatus constructed in accordance with principles of the present invention.

In particular, apparatus constructed in accordance with the present invention may include the following features: (i) a Virtual Tracking System (VTS); (ii) circuitry for reducing cross-talk in the data signals generated for neighboring tracks of an optical disk; (iii) phase-lock loop circuitry that permits a clock associated with a reference track to be used for synchronizing the recovery of data from neighboring tracks; and (iv) a parallel write/asynchronous read architecture that enables blocks of data to be read from the optical disk, processed and written to a buffer in parallel while being asynchronously retrieved from the buffer by a host computer. As will be understood by one of skill in the art of optical disk design, these features may be advantageously used individually or in combination in optical disk apparatus.

Apparatus 10' of FIG. 2 includes pickup assembly 16 having a source of wide-area illumination, as described, for example, in commonly assigned U.S. Pat. No. 5,426,623, and in copending, commonly assigned U.S. patent application Ser. No. 08/315,432, now U.S. Pat. No. 5,566,159, that illuminates multiple adjacent tracks of data spots on the reflective surface of optical disk 100. Pickup assembly further includes an array of optical sensors, such as the time delay integration/charge coupled device (TDI/CCD) described in commonly assigned U.S. Pat. No. 5,426,623, that receives light reflected from the multiple adjacent data tracks and generates in parallel electrical signals representative of the data spots in the multiple adjacent data tracks of optical disk 100.

Virtual tracking system (VTS) 54 analyzes the electrical signals output from the array of optical sensors and selects certain of those electrical signals for further processing by subsequent blocks of circuitry of apparatus 10'. Front end circuitry 56 performs a function similar to that of front end circuitry 22 of FIG. 1, except that multiple bit streams are processed concurrently, so additional circuitry is provided for buffering and synchronizing data transfers to subsequent processing circuitry. Front end circuitry 56 also includes a multiplexer for routing multiple data streams to demodulation circuitry 24.

Memory 58 is provided to buffer the data read from the multiple data tracks, and to decouple the process of reading data from optical disk 100 from the process of transferring the data to host processor 34. Memory 58 therefor is large enough to hold about as many data blocks from multiple data tracks of optical disk 100 as can be read in one revolution of optical disk 100. Controller 38 maps data from the multiple data tracks to memory 58 so that individual data blocks will be correctly assembled without overwriting one another. As will be appreciated by those of skill in the art of buffer design, this mapping may be either dynamic or static.

Figure 3:
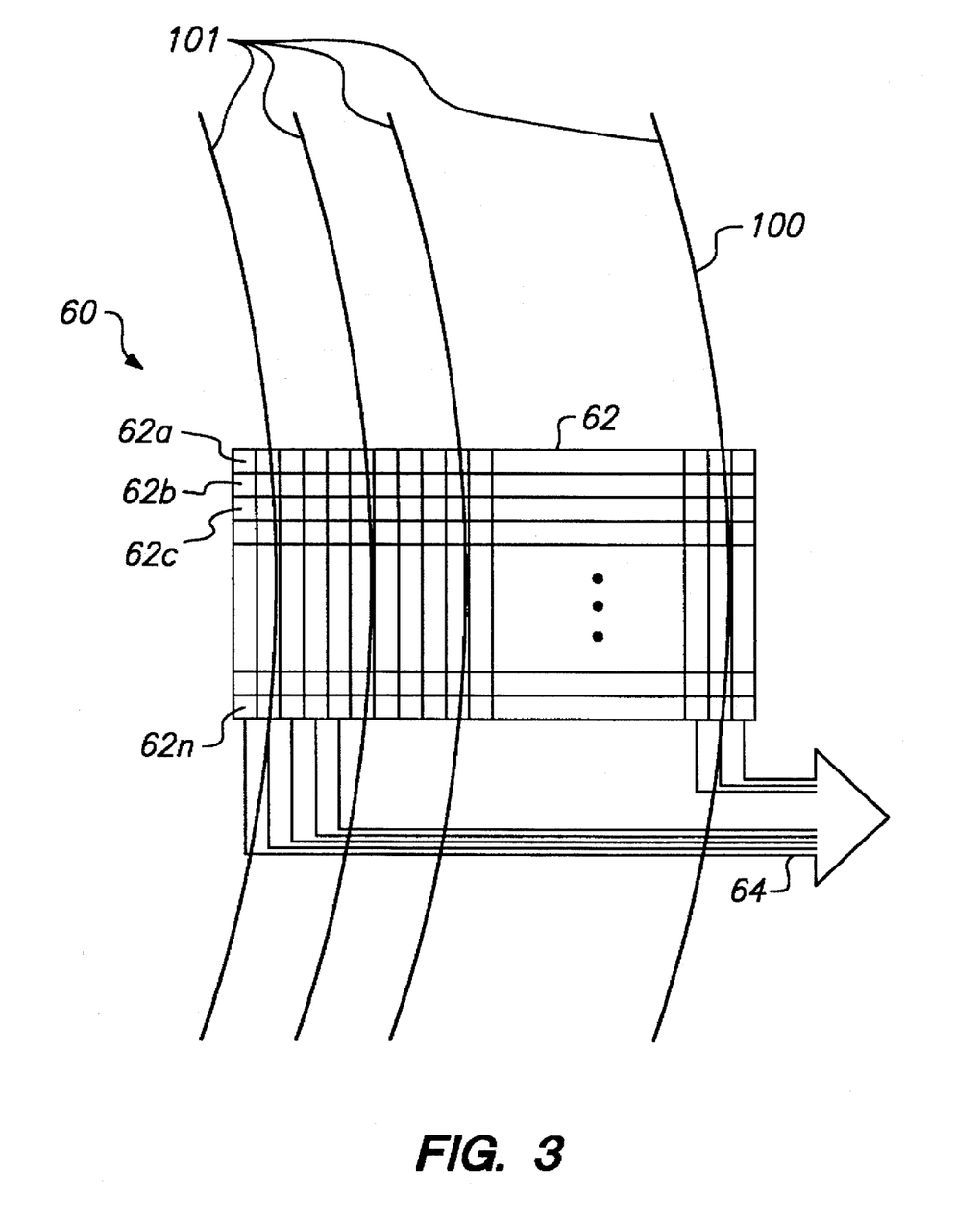
FIG. 3 illustrates a CCD/TDI used as a portion of a pickup assembly.

With respect to FIG. 3, optical pickup 60 suitable for use in an optical disk reader constructed in accordance with the principles of the present invention is described. Track arcs 101 comprise segments of a single spiral track on optical disk 100, or alternatively arcs 101 may be segments of adjacent concentric tracks. Shown superimposed over track segments 101 is optical pickup 60 including detector matrix 62, a charge-coupled device (CCD), which preferably comprises a rectangular array of cells, or pixels, configured for time delay and integration (TDI). The spacing and size of the detector matrix pixels are preferably chosen so that ratio of pixel size to track pitch is approximately four to one (4:1).

As described hereinabove, an area of an optical disk to be read is illuminated by a wide-area beam of illumination. Commonly assigned U.S. Pat. No. 5,426,623, which is incorporated herein in by reference in its entirety, discloses means for illuminating an optical disk in accordance with the present invention. Light reflected from optical disk 100 impinges upon a pixel of detector matrix 62, such as pixel 62a, causing an electrical charge to accumulate in the pixel.

Detector matrix 62 is constructed so that a clocking signal applied to detector matrix 62 causes the charge accumulated in pixel 62a to be transferred to the next pixel in a column of pixels, for example from pixel 62a to pixel 62b. Successive clocking signals applied to detector matrix 62 therefor cause the accumulated charge to be transferred to successive pixels in a column of pixels. The clock signals are preferably applied to detector matrix 62 at a rate so that the charge is transferred down a row of pixels at rate corresponding to the linear speed of the tracks passing below the detector matrix.

In other words, as a point of optical disk 100 passes from being over pixel 62a to being over pixel 62b, the accumulated charge on pixel 62a is transferred to pixel 62b. Sensing lines 64 read the accumulated charge that is transferred out of the last row of pixels 62n and provides electrical signals proportional to the intensity of the light reflected from optical disk 100, as modulated by the data spots contained in tracks 101. A sample and hold circuit may be advantageously used for reading the accumulated charge on the last row of pixels 62n, so as to reduce noise that may be generated by the reset signal supplied to detector matrix 62.

The number and spacing of the pixel columns is related to the track pitch of the optical disk, the number of tracks to be read at once, and the density of the CCD pixels. For example, to read ten tracks spaced 1.6 µm apart with a detector matrix having pixels imaged approximately 0.4 µm apart would require approximately (10*1.6)/0.4 µm=40 pixels.

However, to account for some of the disk eccentricity and for tracking while repositioning pickup assembly 60, it is desirable to include additional pixels in each row of detector matrix 62. In a preferred embodiment of the present invention, detector matrix 62 includes 64 columns of pixels, which is sufficient to span approximately 16 tracks of an optical disk, even though data from only ten tracks is actually selected for processing. In conjunction with the virtual tracking system described hereinbelow, the extra pixels provide for electronic correction of fine tracking errors, while electromechanical tracking of the disk tracks may be used to account for large variations in track positioning, for example, due to eccentricity of the optical disk.

Virtual Tracking System

Figure 4:
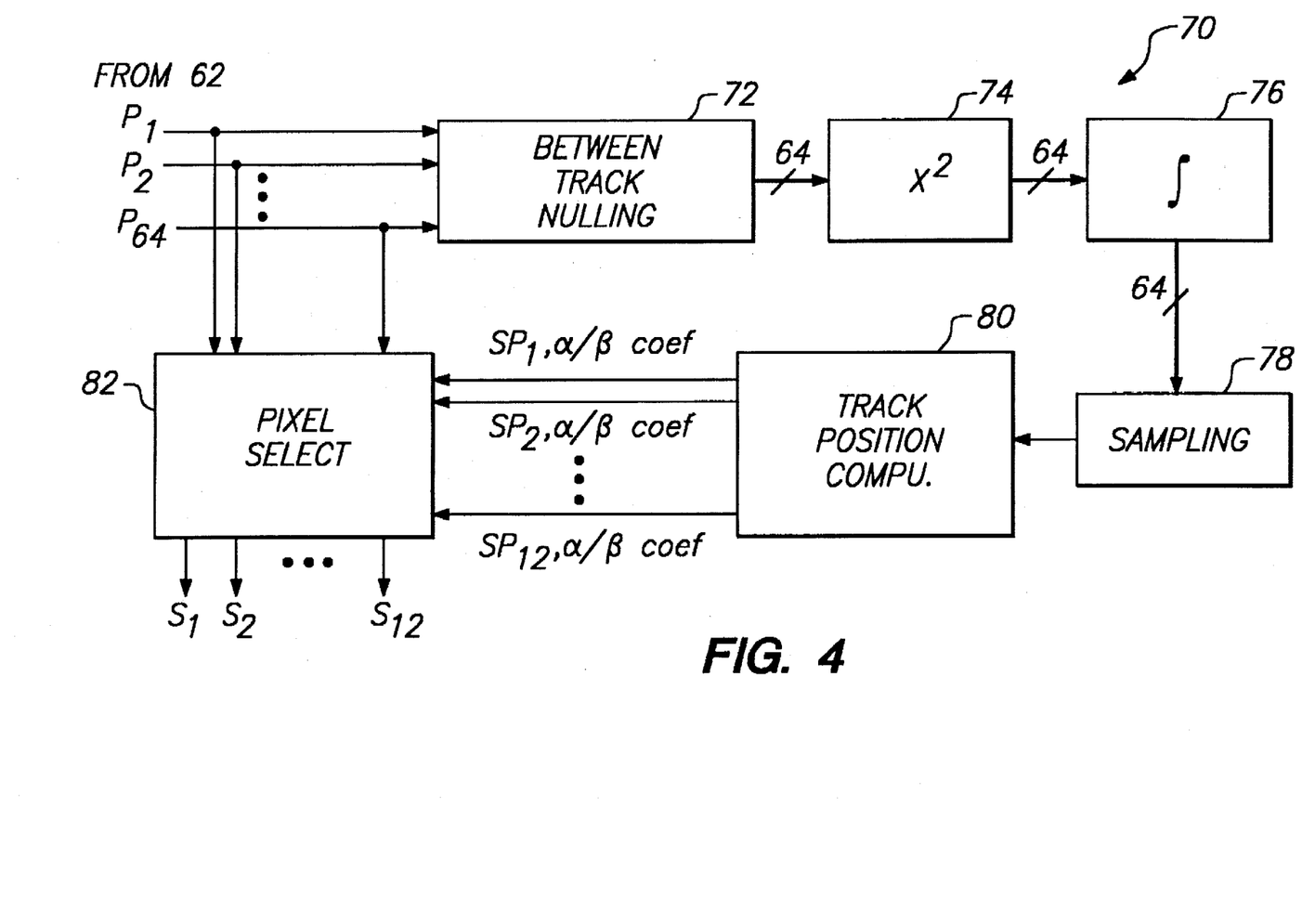
FIG. 4 is a block diagram of a virtual tracking system in constructed in accordance with the principles and methods of the present invention.
Figure 5A:
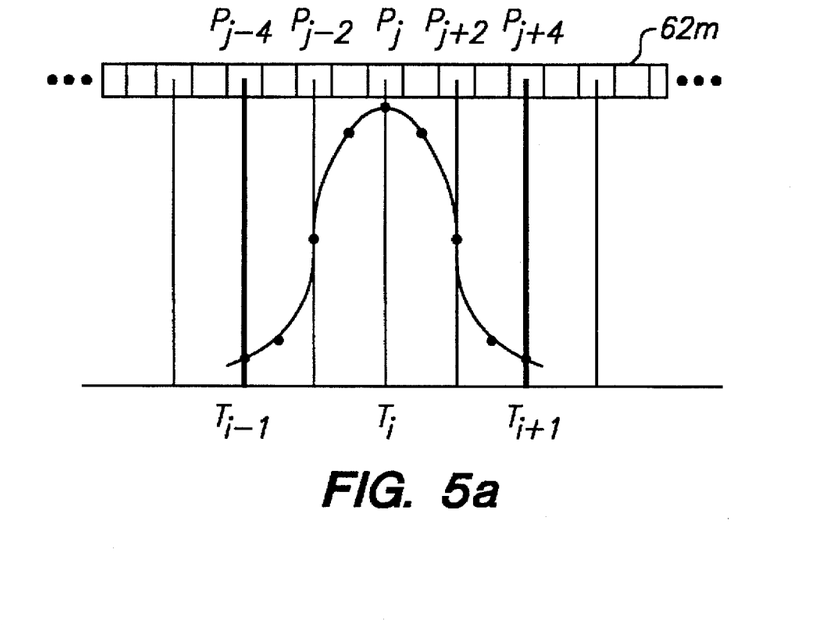
FIGS. 5A and 5B are, respectively, an illustrative point spread functions for pixels of an image detector of an optical disk reader and illustrative pattern of the cross-talk between neighboring pixels.
Figure 5B:
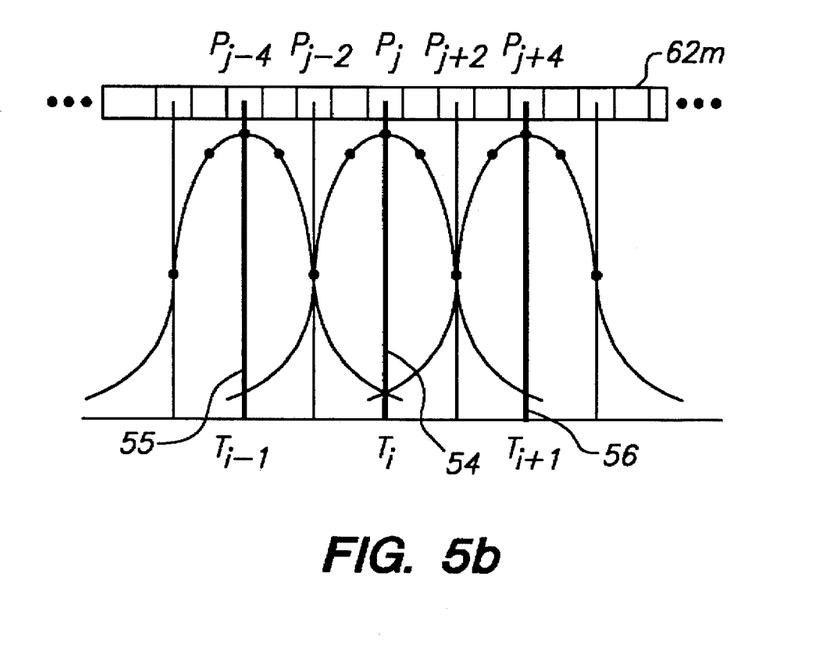

Referring now to FIGS. 4 and 5, virtual tracking subsystem 70 (VTS) constructed in accordance with the methods of the present invention is described. VTS 70 selects from signal lines 64 (see FIG. 3) of detector matrix 62 those signal lines which correspond to pixel columns for which the electrical signals representative of the data in the optical disk tracks is to be further processed. As described above, because about four pixels in detector matrix 60 are used to image a track on optical disk 100, pixels in some columns of detector matrix 62 will receive low-intensity illumination reflected from the data spots in the data tracks, while pixels in other columns will receive high-intensity illumination reflected from between-track areas (i.e., where no data spots are present).

The optical response of a pixel of detector matrix 62 is typically not uniform, but instead manifests a Gaussian point spread function, as shown in FIG. 5A. Also shown in FIG. 5A is row 62m of detector matrix 62 of FIG. 3, and how the centers of tracks $T_{i-1}$, $T_i$ and $T_{i+1}$ align with the pixels in row 62m. The charge accumulated by each pixel of row 62m is proportional to the intensity of the illumination received by that pixel, in accordance with the point spread functions illustratively shown in FIG. 5A.

For example, in FIG. 5B, pixel $P_j$, which is centered over track $T_i$, receives the largest amount of illumination reflected from track $T_i$, while also receiving an illumination from pixels $T_{i-1}$, and $T_{i+1}$, in accordance with above-illustrated pixel point spread function. Pixels $P_{j\pm 4}$ are illustratively centered over tracks adjacent to track $T_i$ and also receive some illumination contribution from track $T_j$. Each pixel therefore receives some illumination contribution from multiple neighboring tracks on the optical disk, an effect referred to as cross-talk.

Optical disk apparatus-constructed in accordance with the principles of the present invention utilizes the shape of the illumination patterns projected onto the pixels of the detector matrix to locate the centers of the disk tracks, and to select which pixels to use to retrieve data from the tracks.

Referring again to FIG. 4, VTS 70 includes circuitry for performing a between track nulling function, a squaring function 74, an integration function 76, a sampling function 78 and a track position computation function 80. The outputs of the track position computation function are fed to a pixel select multiplexer 82 that selects only a subset of the electrical signals generated by detector matrix 62 for further processing.

In particular, VTS 70 receives signals from detector matrix 62 and processes those signals to substantially null, or minimize, the "between track" signals, i.e. from pixels receiving illumination from the reflective portions of optical disk 100 where there are no data spots. Applicants have determined that subtracting from each pixel signal a weighted sum of the signals of neighboring pixels is effective for defining the track boundaries. In one preferred embodiment, the formula:

$$P_{out(j)}=P_{in(j)}-a(P_{in(j-2)}+P_{in(j+2)}) \qquad (1)$$

where:

$P_{in(j)}$ is the unprocessed signal from pixel j;

$P_{in(j\pm 2)}$ is the unprocessed signal from pixel j±2;

$P_{out(j)}$ is the processed signal from pixel j; and a is a constant between about 0.15 and 0.5, and preferably about 0.35, has proven to be effective in nulling between track signals.

The processed signals are then squared by squaring function 74 to obtain signals related to the total illumination energy received by each pixel, and integrated at function block 76 to smooth the signals and average out the high frequency modulation caused by the presence of the data spots in the light reflected from optical disk 100. An integration period of between approximately 2 microseconds and 10 milliseconds, depending upon the spindle speed, is expected to provide satisfactory operation of VTS 70.

Figure 6A:
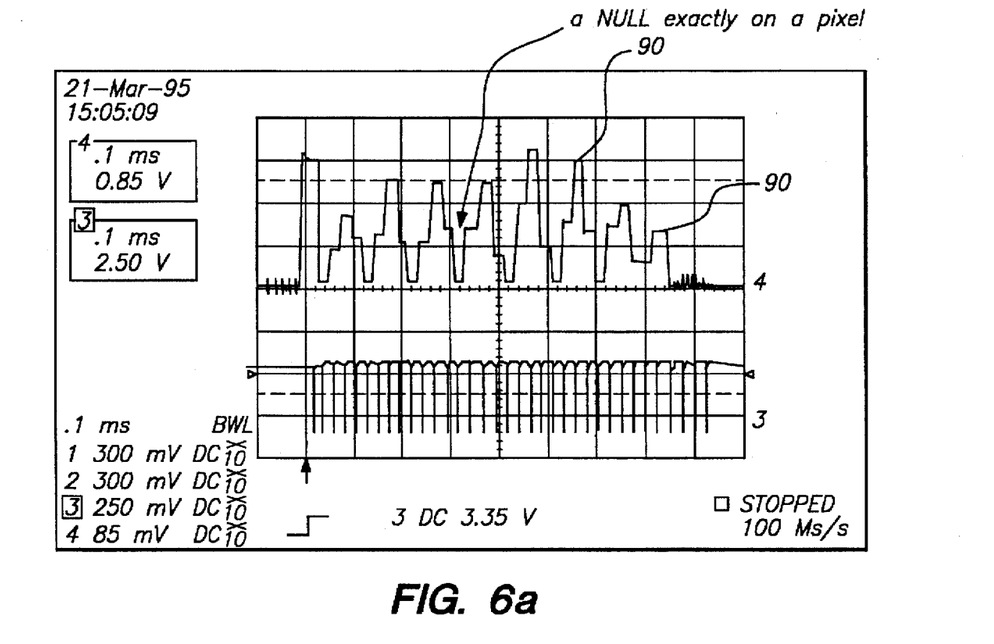
FIGS. 6A and 6B illustrate the effects of between track nulling in accordance with the principles of the present invention.
Figure 6B:
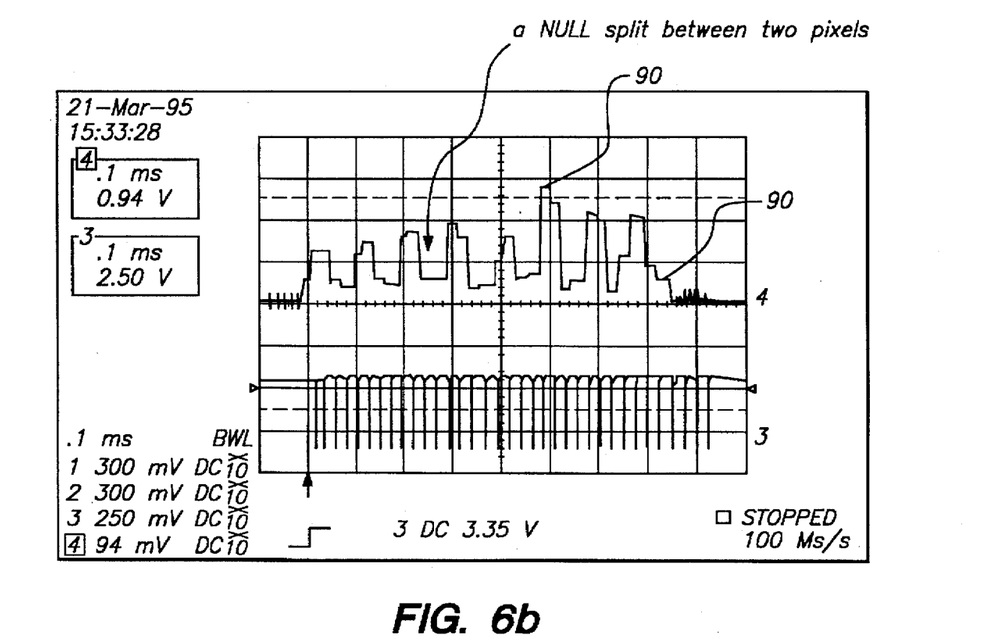

The integrated signals output by integration function 76 are then time division multiplexed and sampled by sampling function 78 to produce a digital signal, referred to as a "manhattan signal" (because of its similarity to the New York skyline). Illustrative digital signals output by sampling function 78 are shown in FIGS. 6A and 6B, in which each "step" 90 in the signal corresponds to a separately processed signal from a column of pixels in detector matrix 62 after integration. As an alternative to VTS 70 described above, a dedicated CCD tracking element, such as described in concurrently filed, co-pending and commonly assigned U.S. patent application Ser. No. 08/559,778 (ZRI-003), which is incorporated herein by reference in its entirety, may be used to provide the input to sampling function 78.

Track position computation function 80 processes the Manhattan signal output by sampling function 78 using oversampling techniques to locate the minima in the signal to subpixel accuracy. Because between track nulling function 72 substantially cancels out the signals for pixels reading the illumination from between track areas of the optical disk, the minima in the Manhattan signal correspond to the centers of the between track areas, and thus the locations of the data tracks may be calculated. Based on the track position calculations, track position computation function 80 provides signals to pixel select circuitry 82, to select those pixel signals 64 which correspond to the tracks which are desired to be read.

Figure 7:
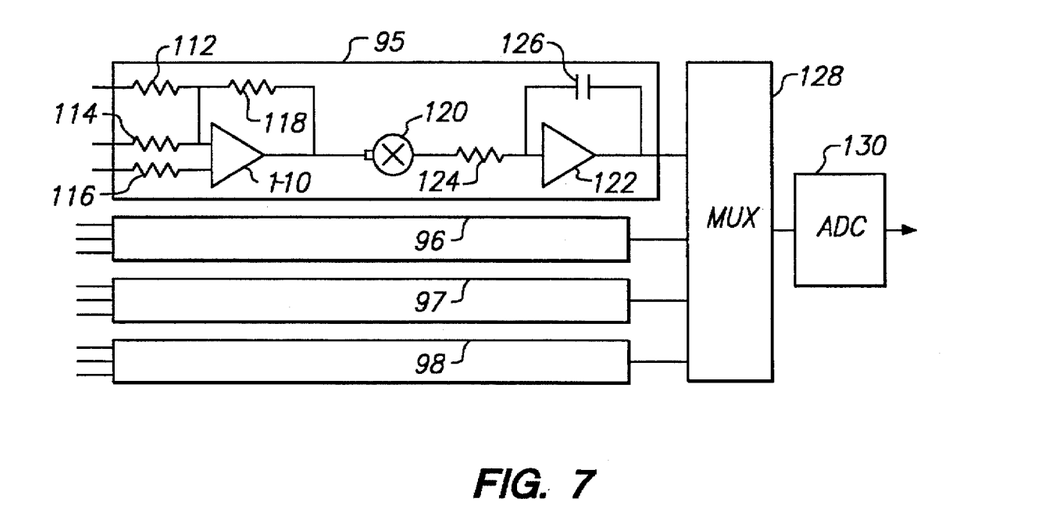
FIG. 7 is an illustrative embodiment of circuitry for performing between track nulling.

Referring now to FIG. 7, a schematic of illustrative circuitry of one embodiment of VTS 70 of the present invention is described. Between track nulling for a first pixel in a row is accomplished by circuitry block 95, which includes operational amplifiers configured as difference amplifiers. Circuit block 95 receives as inputs the signals from pixel $P_j$ and its $P_{j-2}$ and $P_{j+2}$ neighboring pixels. Operational amplifier 110 is coupled to resistors 112, 114, 116, and 118 to form a difference amplifier which calculates an output voltage $V_o$ according to:

$$V_o = V_n(1 + R_{118}/R_{116}) - R_{118}(V_{n-2}/R_{112} + V_{n+2}/R_{114}). \quad (2)$$

The value of resistors 112, 114, 116, and 118 may then be chosen to approximate equation (1). The output of the difference amplifier is squared by multiplier 120 and then integrated by an integrating amplifier comprising operational amplifier 122, resistor 124, and feedback capacitor 126.

Circuitry blocks 96, 97, 98, etc., contain replications of the circuitry of block 95, as described hereinabove, as needed to perform between track nulling for all of the pixel signals output by detector matrix 62. The outputs of circuits 95, 96, 97, 98, etc., are then multiplexed into a single signal by analog multiplexer 128 and digitized by analog-to-digital converter (ADC) 130 to produce the Manhattan signal.

Referring again to FIG. 4, track position computation function 80 then computes the positions of the data tracks—and identifies the corresponding pixel signals therefor—by processing the Manhattan signal output by ADC 130. This track position computation function may be performed, for example, using a digital signal processor (DSP), that reads digital samples from ADC 130, and using oversampling techniques, filters the sampled data to remove high frequency noise introduced by the multiplexing and sampling process.

Minima in the Manhattan signal, which correspond to between track locations, are then calculated to subpixel accuracy. Based on the determination of the between track locations, the positions of the data tracks may also be calculated to subpixel accuracy. Track position computation function 80 outputs to pixel selector 82 the track positions as pixel select signals, and optional cross-talk cancellation coefficients, described below.

Figure 8:
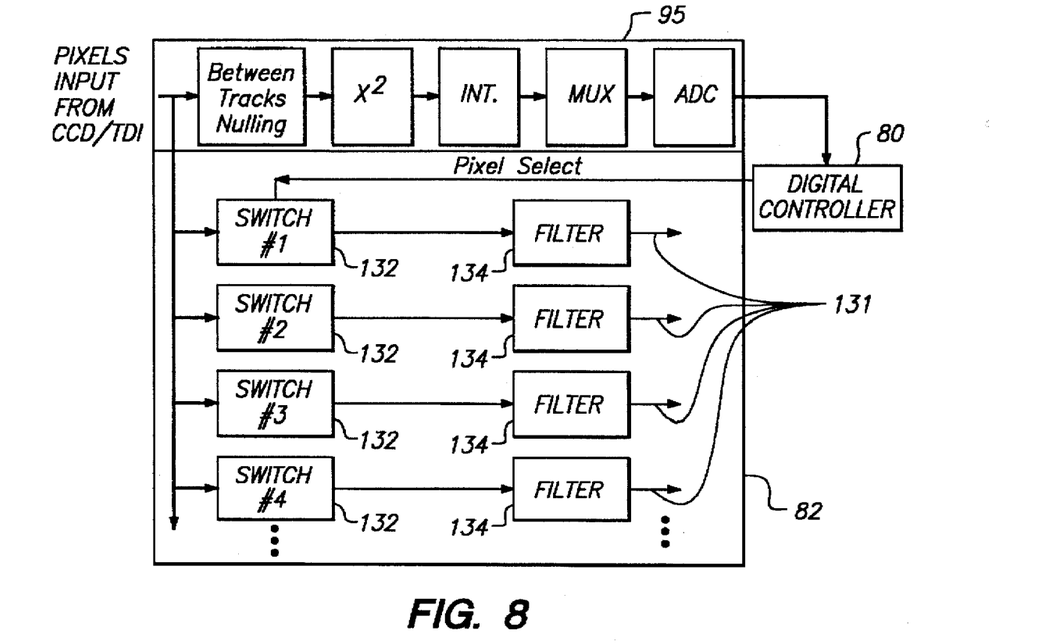
FIGS. 8 and 9 are illustrative block diagram schematics of two embodiments of the pixel selector of FIG. 4, for an optical disk having low and high track densities, respectively.

Referring now also to FIG. 8, pixel selector 82 includes one switch 132 for each output line 132. Each switch 132 routes a selected one of the signals on its inputs to its output. The input pixel signals to be output by switches 132 is controlled by the pixel select signals from track position computation function 80, so that pixel signals corresponding to track data will always be selected.

Pixel selector 82 may employ multiple stages to reduce the complexity and cost of the multiplexer architecture. For example, in one preferred embodiment of pixel selector 82 for handling 64 sensing lines from detector matrix 62, a two-stage multiplexer is employed having a first stage of thirty-two 2:1 multiplexers followed by a second stage having fourteen 15:1 multiplexers. Alternatively, the second stage may include sixteen multiplexers if the first stage multiplexers are smaller.

As the positions of the disk tracks change relative to the pixel columns of detector matrix 62, for example, as a result of eccentricity of the optical disk, the track position computation function 80 adjusts the pixel select signals so that switches 132 continually select the pixel signals that correspond to desired disk tracks. This process provides a method of tracking desired disk tracks electronically for relatively small radial movements of the data track, without repositioning the pickup assembly. Of course, larger radial movement of the disk tracks also may be accommodated by electromechanical movement of the pickup head. The output signal of each switch 132 is filtered by low-pass (LP) filters 134, preferably fourth-order LP filters, to remove noise and switching artifacts from the signals before further processing.

Cross-Talk Correction Circuitry

As discussed in connection with FIG. 5B, the intensity of the illumination received by a pixel includes a cross-talk component representing illumination from adjacent tracks. For low density optical disks, i.e. disks with a track pitch of approximately 1.6 µm, the cross-talk illumination may be sufficiently small that the disk may be read accurately without the need for cross-talk cancellation. However, for high track densities, for example, the new DVD format, cross-talk may become severe when attempting to simultaneously read multiple adjacent tracks and interfere with accurate disk reading. Accordingly, cross-talk cancellation may be required to reliably read high density optical disks.

Figure 9:
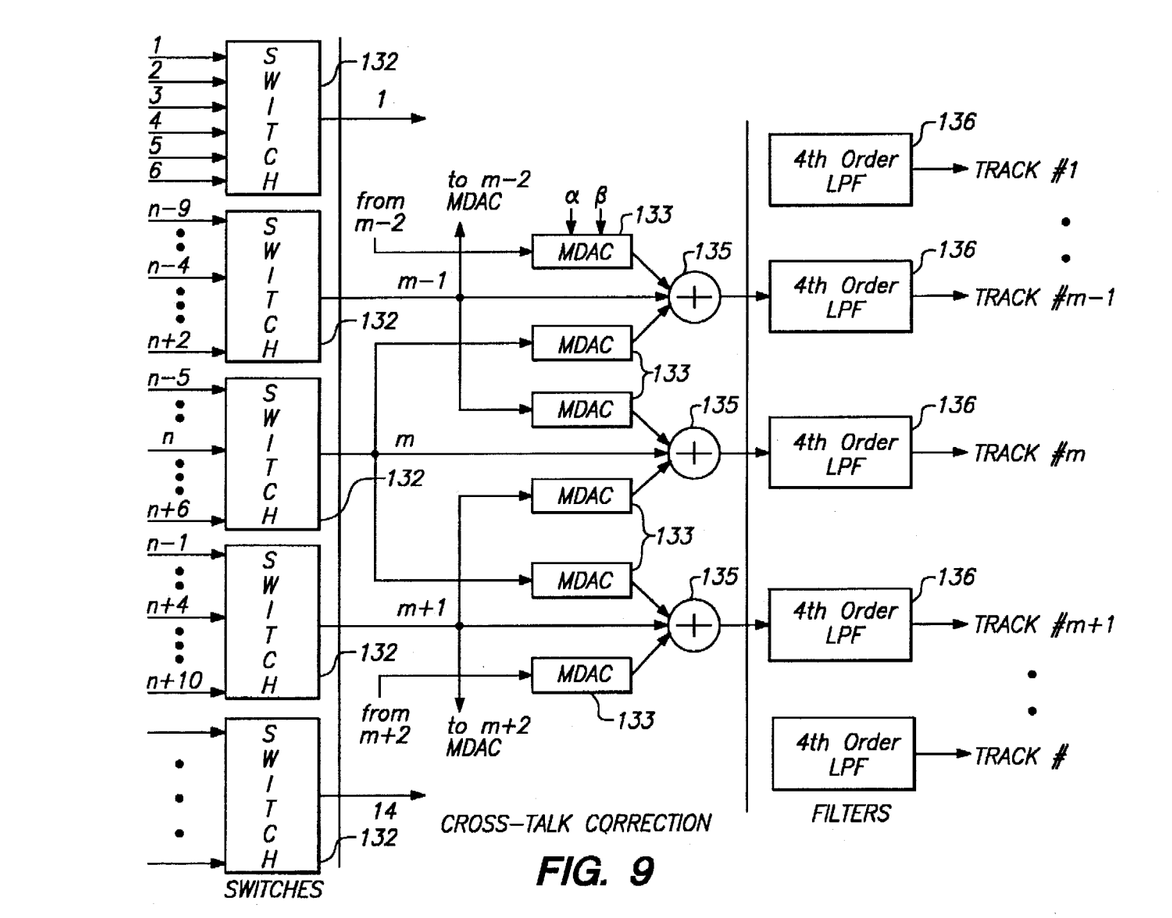

FIG. 9 illustrates one embodiment of pixel selector 82 which includes optional cross-talk cancellation circuitry suitable for high density optical disks. As in the discussion of the embodiment of FIG. 8, a plurality of switches 132 select pixel signals as determined by track position computation function 80. While calculating track positions and determining the pixel select signals, track position computation function 80 also determines cross-talk cancellation coefficients, $\alpha$ and $\beta$. Cross-talk cancellation coefficients $\alpha$ and $\beta$ are based upon the distance from the center of a selected pixel to the center of the disk tracks on either side of the pixel. For example if a pixel is exactly aligned with a disk track, then the cross-talk from the adjacent tracks on either side will be equal; however, if a pixel is located slightly offset with respect to the disk track, then it will receive a larger cross-talk component from the nearer adjacent track and a smaller component from the farther adjacent track. Track position computation function 80 may either calculate the values of $\alpha$ and $\beta$, or, alternatively, may look up the values of $\alpha$ and $\beta$ in a coefficient look up table, stored for example, in ROM.

Multiplying Digital-to-Analog Converters (MDAC) 133 use the values of $\alpha$ or $\beta$ provided by track position computation function 80 to scale the signals output by switches 132. The scaled and unscaled pixel signals, $S_m$ and $S_{m\pm1}$, respectively, are summed at block 135 according to the formula:

$$T_m = S_m - \alpha S_{m-1} - \beta S_{m+1} \quad (3)$$

and filtered, for example, by fourth-order low pass filters 136, to produce track data signal $T_m$.

The circuits and processes of the virtual tracking system described in conjunction with FIGS. 4 through 9, ultimately output, in parallel, a number of track data signals $T_m$ which have been modulated by the data recorded in several adjacent disk tracks. Circuitry for extracting and processing the data from the track data signals in now described in connection with FIGS. 10 through 13.

Multi-track Phase Lock Loop Circuitry

Figure 10:
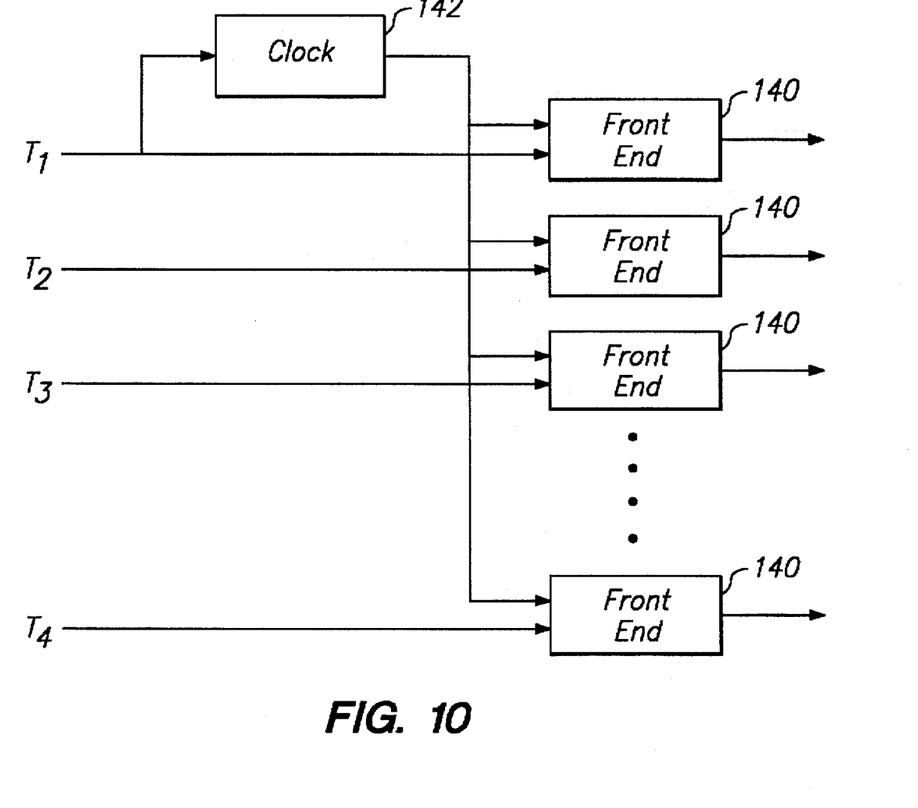
FIG. 10 is a block diagram of circuitry for extracting data from the signals output by the pixel selector of FIG. 4.

Referring to FIG. 10, each track data signal $T_m$, output, for example, by VTS 70 or a dedicated CCD-tracking detector, as described in the above-incorporated application in conjunction with a suitable pixel selector 82, is processed by front end circuitry 140. Front end circuitry 140 converts the modulated track data signal to a parallel data word. Clock circuitry 142 generates a reference clock from a selected track data signal, the reference track signal. The reference clock is sent to front end circuitries 140 and is used to extract data existing in the modulation of the track data signals, as described hereinbelow.

Figure 11:
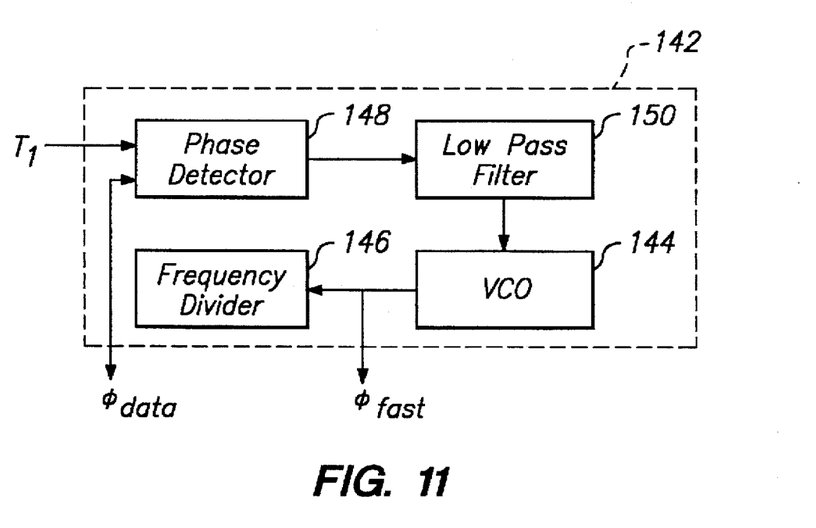
FIGS. 11 and 12 are, respectively, a block diagram providing more detail of the clock circuitry of FIG. 10 and a block diagram of the digital PLL circuitry of the front end circuitry of FIG. 10.

Referring now to FIG. 11, clock circuitry 142 comprises a phase-locked loop and includes voltage controlled oscillator (VCO) 144 for generating a fast clock signal, $\Phi_{fast}$, having a frequency that is a multiple of the data rate (frequency) of the reference track data signal. Divider/counter 146, reduces the frequency of the signal output by VCO 144 to generate a data clock signal, $\Phi_{data}$, having a frequency nearly the same as that of the track data signal. An error signal which indicates the difference between the data clock frequency and the track data frequency is generated by phase detection circuitry 148, the error signal being proportional to the phase difference between the data clock signal and the reference track data signal. The error signal is then integrated and filtered by filter block 150 to produce a voltage signal corresponding to the desired frequency of the output signal of VCO 144.

For example, if the frequency output by frequency divider 146 is too high (because the frequency of VCO 144 is too high), the phase difference between the track data and the data clock will increase. This increase in phase difference is detected by phase detection circuitry 148, and converted into an error signal that is filtered by low pass filter 150 to produce a voltage that causes VCO 144 to generate a signal having a lower frequency.

An accurate data clock is needed to reliably extract the data from the track data signals. The data clock generated by the circuitry of FIG. 11 has a frequency and phase which are correct for the reference track data signal. However, because the track data signals are read from tracks having different radii, and therefore slightly different linear velocities, the corresponding track data signals differ slightly in frequency and may differ substantially in phase. For example, for a CD-ROM optical disk, applicants have determined that the change in linear velocity for any two adjacent tracks is approximately 0.011 anywhere on the optical disk, while the phase difference may be much larger. Consequently, a single data clock cannot be used directly to extract data from each track data signal. Front end circuitry 140 of FIG. 10 therefore includes circuitry for correcting the phase and frequency of the system data clock $\Phi_{data}$.

Figure 12:
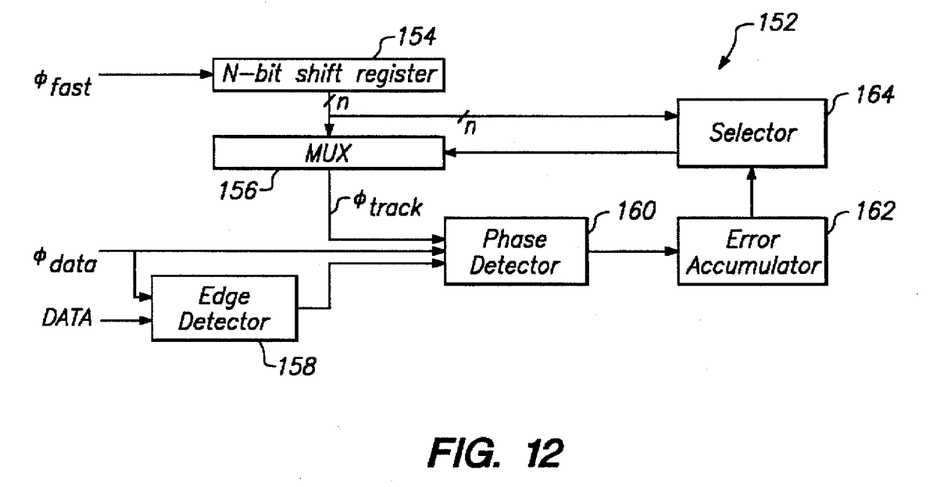

Turning now to FIG. 12, digital PLL circuitry 152 of front end circuitry 140 (see FIG. 13) is described. Digital PLL circuitry 152 corrects the phase and frequency of system data clock to match that of the track data signals. Fast clock signal $\Phi_{fast}$ is used as the clock input to shift register 154, which is configured as a ring counter. Shift register 154 is loaded with a bit pattern having only a single bit which is set, for example 01000000$_2$, the remaining bits being cleared. Each pulse of fast clock $\Phi_{fast}$ causes the bit pattern in shift register 154 to shift one bit position, or cell. A bit which is shifted out the end of shift register 154 is "wrapped around" and shifted back in at the other end of the shift register. Thus the single set bit in shift register 154 circulates through each cell in the register at a frequency determined by fast clock $\Phi_{fast}$.

The value of each cell in shift register 154 is input to multiplexer 156, which functions to output the value of a selected one of the shift register cells. The combination of shift register 154 and multiplexer 156 functions to divide the frequency of fast clock $\Phi_{fast}$ by the number of bits in the shift register to produce track clock $\Phi_{track}$. For example, if shift register 154 were to have eight bits, each bit position would have a '1' bit in it only once every eight pulses of the fast clock. Thus if multiplexer 156 were to selectively output the value of bit three of shift register 154, the output of the multiplexer would be a '1' whenever there was a '1' in bit position three of the shift register, i.e. once every eight pulses of fast clock $\Phi_{fast}$.

Edge detector 158 generates a pulse on every edge, i.e. high-low or low-high transition, of the track data signal. Phase detector 160 determines the phase relationship between the occurrence of pulses of track clock $\Phi_{track}$ output by multiplexer 154 and pulses from edge detector 158. Ideally, an edge pulse from edge detector 158 should occur midway between successive pulse of track clock $\Phi_{track}$. An edge pulse which occurs early indicates that the track clock is slow, and conversely a late edge pulse indicates the track clock is fast. The output of phase detector 160 indicates the position of an edge pulse relative to the midpoint between successive track clock pulses. Error accumulator 162 monitors and accumulates the error signal from phase detector 160, and filters the error signal to reduce the effects of jitter between the clock and edge pulses.

When the accumulated error is sufficiently large to warrant corrective action, selector 164 adjusts the phase of track clock $\Phi_{track}$ by causing multiplexer 156 to select a different input to pass through to its output. Changing the multiplexer's input either inserts or removes a small amount of time to the interval from one track clock pulse to the next such pulse. For example, if shift register 154 has eight bits and is designed to shift bits to the right, and if selector 164 causes multiplexer 156 to change its input from bit position three to bit position four, the next pulse output by multiplexer 156 will occur on the seventh fast clock pulse instead of the eighth. Conversely, changing the multiplexer's input from bit position three to bit position two will cause a track clock pulse to occur on the ninth fast clock pulse. Thus by changing the bit selected by multiplexer 156, the phase and frequency differences between the reference track data signal and another track data signal can be corrected.

Because a track clock pulse cannot be dropped or missed without corrupting the recovered data, selector 164 includes logic to prevent selection of a different input by the multiplexer at an inopportune time. For example, if multiplexer 156 is reading bit position 6 of shift register 154, a '1' is in bit position five, and shift register 154 shifts right (i.e. the '1' in bit position six moves to bit position five) at the same instant selector 164 switches the input of multiplexer 156 from bit position five to bit position six, a clock pulse will be missed, and a data bit will not be sampled correctly. Just as a multiplexer 156 changing inputs in the opposite direction of the bit shifts in shift register 154 can cause a dropped clock pulse, a change in the same direction as the bit shifts can cause an extra clock pulse to occur. Since too few, or too many clock pulses may garble the data being read, selector 164 monitors the output of shift register 154 to avoid the occurrence of situations which may lead to data corruption.

Figure 13:
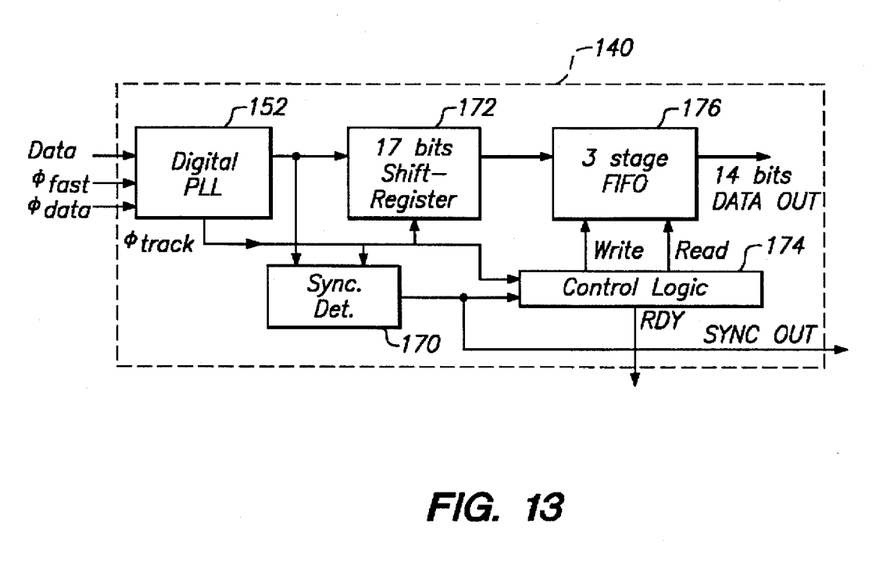
FIG. 13 is a block diagram of the front end circuitry of FIG. 10.

Referring to FIG. 13, the remaining circuitry of front end 140, as illustratively described in the context of a CD-ROM system, is now described. Digital PLL 152, described in reference to FIG. 12, is used to sample the track data signal and generate a stream of bits. The bit stream is monitored by synchronization detector circuitry 170 to determine the beginning of a data block. The serial bit stream is also shifted into shift register 172 to accumulate bits into data words or symbols.

Control logic 174 is synchronized with a data block by a signal from synchronization detector 170. When a complete data word is assembled in shift register 172, control logic 174 causes the data word to be read into first-in, first-out (FIFO) buffer 176 where it is retrieved by demodulation circuitry 24 of FIG. 2. As will of course be apparent, the circuitry of FIG. 13 may be readily modified for use with other optical disk formats, for example, the proposed MMCD, SD and DVD formats.

Parallel Write/Asynchronous Read Buffer

Figure 14:
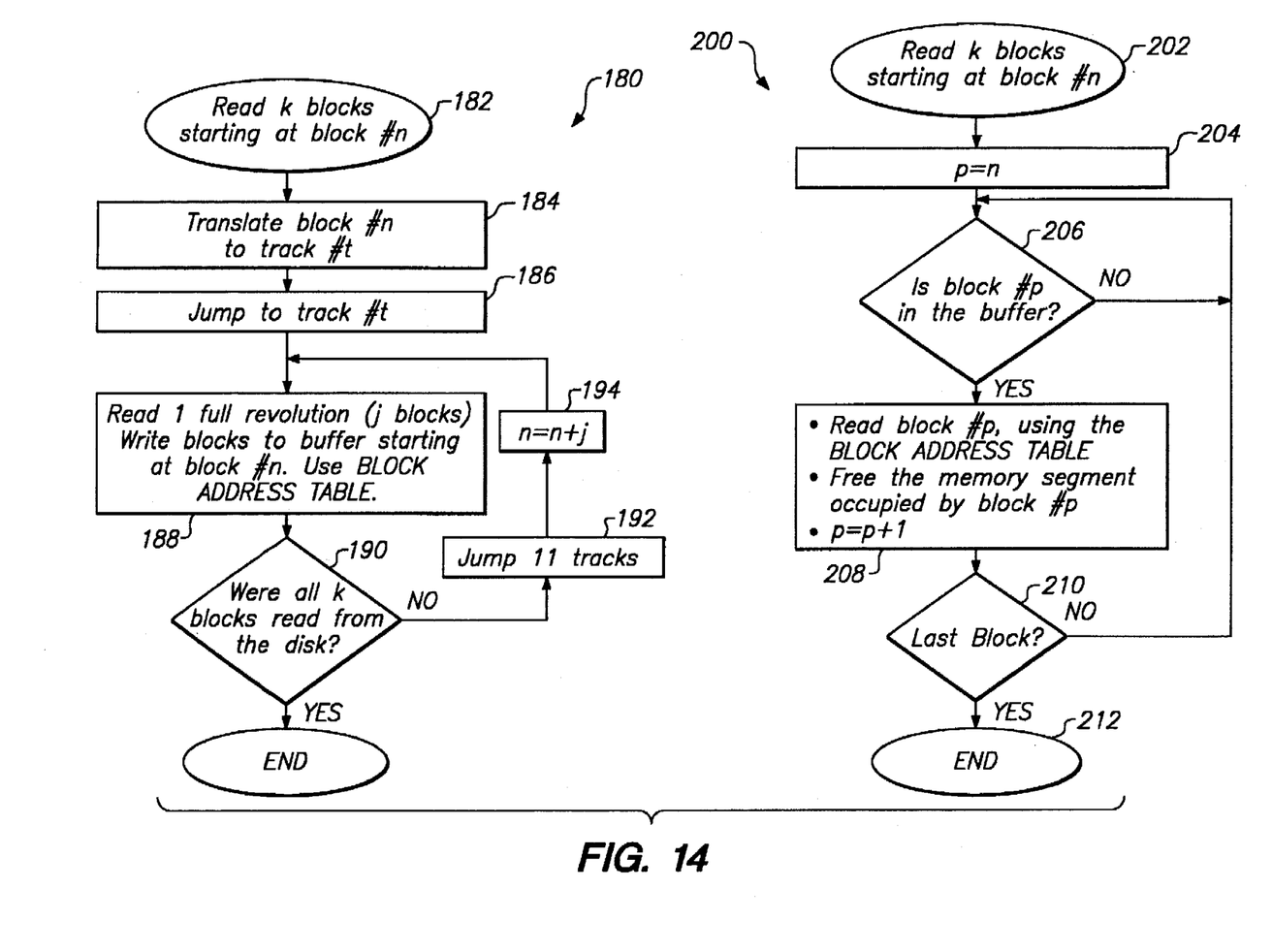
FIG. 14 is a flow chart outlining illustrative processes for reading a requested block of data from an optical disk and providing the requested block of data to a host processor, respectively.

With reference to FIGS. 2 and 14 illustrative processes for reading and writing blocks of data in parallel from the optical disk to a buffer and for reading a block of data requested by host processor 34 are described. The process of providing a data block to a host processor is split into two asynchronous processes illustrated by flowcharts 180 and 200, corresponding, respectively, to reading data from the disk and the process of providing the data to the host processor.

Process 180 is entered, at 182, with a request to read a total of k data blocks starting at block n. At steps 184 and 186, controller 38 (see FIG. 2) calculates, or looks up in a table, the track t which contains data block n, and, if required, positions the pickup assembly to read track t as well as several adjacent tracks. When the pickup assembly has settled, a desired number of data blocks are read in parallel from optical disk 100 and stored in buffer 58. As data blocks are written to buffer 58, a Block Address Table is updated to reflect the block numbers currently stored in the buffer. If at step 190 it is determined that all k data blocks have not been read, a new starting block is determined (step 194), and the pickup assembly is repositioned (step 192). Data reading process 180 terminates when all of the requested data has been read and transferred to buffer 58.

The process of flowchart 200 is performed concurrently with the process of flowchart 180. This process is entered when the host processor requests k data blocks beginning at block n. Upon receiving this request, controller 38 first determines at block 206 whether the data block is already in buffer 58 by consulting the Block Address Table. If the data block is present, then the data block is retrieved from buffer 58 and transferred to host processor 34. If the data block has not been read yet, the process of flowchart 180 is initiated to read the desired block while process 200 waits for the data to become available in buffer 58. These steps are repeated as necessary until the last block of the requested data has been transferred to the host processor.

In process 200, when a desired data block is read from buffer 58, the pointer to that portion of buffer 58 may be freed to be subsequently written by the blocks of data being read off of the optical disk by process 180. As described hereinabove, in one preferred embodiment of the invention, buffer 58 is capable of holding the data for about one full revolution of optical disk 100.

While preferred illustrative embodiments of the present invention are described, it will be obvious to one skilled in the art that various changes and modifications may be made therein without departing from the invention and it is intended in the appended claims to cover all such changes and modifications which fall within the true spirit and scope of the invention.

What is claim is:

1. Apparatus for simultaneously reading multiple data tracks of an optical disk, the apparatus comprising:

an illumination source that illuminates multiple data tracks on the optical disk;

a detector for receiving illumination reflected from the optical disk and for generating a plurality of data signals corresponding to data stored in the multiple data tracks;

an optical system for directing the illumination reflected from the optical disk to the detector;

circuitry coupled to the detector for performing a between track nulling function on the plurality of data signals that determines local maxima within the plurality of data signals, outputs of the between track nulling function employed for computing track selection signals corresponding to locations of selected ones of the multiple data tracks;

selector circuitry for selecting a subset of the plurality of data signals for processing responsive to the track selection signals; and circuitry for processing the subset of the plurality of data signals to recover information stored on the optical disk.

2. Apparatus as defined in claim 1 wherein the between track nulling function involves subtracting from each one of the plurality of data signals a weighted sum of predetermined neighboring ones of the plurality of data signals.

3. Apparatus as defined in claim 2 further comprising circuitry for performing a smoothing operation on the output of the between track nulling function.

4. Apparatus as defined in claim 3 further comprising circuitry for computing track selection signals corresponding to locations of selected ones of the multiple data tracks.

5. Apparatus as defined in claim 4 wherein the circuitry for computing track selection signals includes circuitry for sampling output signals of the smoothing operation.

6. A method of simultaneously reading multiple data tracks of an optical disk, the method comprising a series of steps of:

illuminating multiple data tracks of the optical disk to create reflected illumination;

receiving the reflected illumination and generating a plurality of data signals corresponding to data stored in the multiple data tracks;

performing a between track nulling function on the plurality of data signals that determines local maxima within the plurality of data signals, the between track nulling function generating output signals;

computing track selection signals using the output signals, the track selection signals corresponding to locations of selected ones of the multiple data tracks;

selecting a subset of the plurality of data signals for processing responsive to the track selection signals; and processing the subset of the plurality of data signals to recover information stored on the optical disk.

7. The method as defined in claim 6 wherein the step of performing the between track nulling function involves subtracting from each one of the plurality of data signals a weighted sum of predetermined neighboring ones of the plurality of data signals.

8. The method as defined in claim 7 further comprising a step of performing a smoothing operation on the output of the between track nulling function.

9. The method as defined in claim 8 further comprising a step of computing track selection signals corresponding to locations of selected ones of the multiple data tracks.

10. The method as defined in claim 9 wherein the step of computing track selection signals includes a step of sampling output signals of the smoothing operation.

11. Apparatus for simultaneously reading multiple data tracks of an optical disk, the apparatus comprising:

an illumination source that illuminates multiple data tracks on the optical disk;

a detector for receiving illumination reflected from the optical disk and for generating a plurality of data signals corresponding to data stored in the multiple data tracks;

an optical system for directing the illumination reflected from the optical disk to the image detector;

track selection circuitry coupled to the detector for performing a between track nulling function on the plurality of data signals that determines local maxima within the plurality of data signals and for computing track selection signals corresponding to locations of selected ones of the multiple data tracks;

selector circuitry for selecting a subset of the plurality of data signals for processing responsive to the track selection signals, the selector circuitry including circuitry for correcting the subset of the plurality of data signals to account for cross-talk between the multiple data tracks; and circuitry for processing the subset of the plurality of data signals to recover information stored on the optical disk.

12. Apparatus as defined in claim 11 wherein the circuitry for correcting determines cross-talk correction coefficients and corrects the subset of the plurality of data signals by computing a corrected data signal for each one of the subset, the corrected data signal comprising a sum of the respective one of the subset and a weighted sum of predetermined neighboring ones of the subset.

13. Apparatus as defined in claim 12 wherein the circuitry for correcting computes the cross-talk correction coefficients based on the locations of selected ones of the multiple data tracks.

14. Apparatus as defined in claim 13 wherein the detector comprises a pixel and the cross-talk correction coefficients are computed based on the location of the pixel relative to selected ones of the multiple data tracks.

15. Apparatus as defined in claim 12 wherein the circuitry for correcting determines the cross-talk correction coefficients by referring to a look-up table.

16. A method of simultaneously reading multiple data tracks of an optical disk, the method comprising a series of steps of:

illuminating multiple data tracks of the optical disk to create reflected illumination;

receiving the reflected illumination and generating a plurality of data signals corresponding to data stored in the multiple data tracks;

performing a between track nulling function on the plurality of data signals to determine local maxima within the plurality of data signals;

computing track selection signals corresponding to locations of selected ones of the multiple data tracks responsive to the local maxima within the plurality of data signals;

selecting a subset of the plurality of data signals for processing responsive to the track selection signals;

correcting the subset of the plurality of data signals to account for cross-talk between the multiple data tracks; and processing the subset of the plurality of data signals to recover information stored on the optical disk.

17. The method as defined in claim 16 wherein the step of correcting comprises a step of determining cross-talk correction coefficients and a step of correcting the subset of the plurality of data signals by computing a corrected data signal for each one of the subset, the corrected data signal comprising a sum of the respective one of the subset and a weighted sum of predetermined neighboring ones of the subset.

18. The method as defined in claim 17 wherein the step of correcting comprises computing the cross-talk correction coefficients based on the locations of selected ones of the multiple data tracks.

19. The method as defined in claim 17 further comprising a step of providing a detector having a pixel and a step of computing the cross-talk correction coefficients based on the location of the pixel relative to selected ones of the multiple data tracks.

20. The method as defined in claim 17 wherein the step of correcting comprises determining the cross-talk correction coefficients from a look-up table.

* * * * *